United States Patent
Ma et al.

(10) Patent No.: US 10,194,460 B2
(45) Date of Patent: Jan. 29, 2019

(54) USER EQUIPMENT, NETWORK SIDE DEVICE, AND METHOD FOR SENDING DPCCH

(71) Applicant: Huawei Technologies Co., Ltd., Shenzhen (CN)

(72) Inventors: Xueli Ma, Shenzhen (CN); Fan Wang, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/248,801

(22) Filed: Aug. 26, 2016

(65) Prior Publication Data
US 2016/0366700 A1    Dec. 15, 2016

Related U.S. Application Data

(63) Continuation of application No. PCT/CN2014/072649, filed on Feb. 27, 2014.

(51) Int. Cl.
*H04W 4/00* (2018.01)
*H04W 72/12* (2009.01)
(Continued)

(52) U.S. Cl.
CPC ......... *H04W 72/1289* (2013.01); *H04L 5/001* (2013.01); *H04L 5/0048* (2013.01);
(Continued)

(58) Field of Classification Search
CPC .......... H04W 76/048; H04W 72/1289; H04W 76/046; H04W 88/02; H04W 28/18; H04L 5/001; H04L 5/0048; H04L 5/0053
See application file for complete search history.

(56) References Cited

U.S. PATENT DOCUMENTS

| | | | |
|---|---|---|---|
| 2009/0296643 A1 | 12/2009 | Cave et al. | |
| 2009/0316575 A1 | 12/2009 | Gholmieh et al. | |

(Continued)

FOREIGN PATENT DOCUMENTS

| | | |
|---|---|---|
| CN | 101754338 A | 6/2010 |
| CN | 101902810 A | 12/2010 |

(Continued)

OTHER PUBLICATIONS

"3rd Generation Partnership Project; Technical Specification Group Radio Access Network; Physical layer procedures (FDD) (Release 11)," 3GPP TS 25. 214, V11.7.0, pp. 1-128, 3rd Generation Partnership Project, Valbonne, France (Sep. 2013).

*Primary Examiner* — Zewdu A Beyen
(74) *Attorney, Agent, or Firm* — Leydig, Voit & Mayer, Ltd.

(57) ABSTRACT

Embodiments of the present invention disclose a user equipment, a network side device, and a method for sending a DPCCH, which relate to the field of communications, so as to implement that the network side device knows a moment at which a DPCCH is sent and a DPCCH is periodically sent. Solutions provided in the embodiments of the present invention include: receiving indication information sent by the network side device by using the user equipment; activating a second carrier of DC-HSUPA according to the indication information; acquiring uplink DTX parameters; and periodically sending an uplink DPCCH on the second carrier of the DC-HSUPA according to the indication information and the uplink DTX parameters. The present invention is used to send a DPCCH.

19 Claims, 4 Drawing Sheets

(51) Int. Cl.
*H04W 76/27* (2018.01)
*H04W 76/28* (2018.01)
*H04L 5/00* (2006.01)
*H04W 28/18* (2009.01)
*H04W 88/02* (2009.01)

(52) U.S. Cl.
CPC .......... *H04L 5/0053* (2013.01); *H04W 76/27* (2018.02); *H04W 76/28* (2018.02); *H04W 28/18* (2013.01); *H04W 88/02* (2013.01)

(56) References Cited

U.S. PATENT DOCUMENTS

| | | |
|---|---|---|
| 2010/0130219 A1 | 5/2010 | Cave et al. |
| 2010/0278130 A1* | 11/2010 | Sambhwani ...... H04W 72/0453 370/329 |
| 2013/0072208 A1 | 3/2013 | Marinier et al. |
| 2016/0056944 A1 | 2/2016 | Cave et al. |

FOREIGN PATENT DOCUMENTS

| | | |
|---|---|---|
| CN | 102246572 A | 11/2011 |
| CN | 102387581 A | 3/2012 |
| EP | 2227059 A1 | 9/2010 |
| JP | 2011519539 A | 7/2011 |
| JP | 2011525782 A | 9/2011 |
| JP | 2012510237 A | 4/2012 |
| WO | 2009132290 A2 | 10/2009 |
| WO | WO 2010008837 A2 | 1/2010 |
| WO | 2010051514 A1 | 5/2010 |
| WO | 2010068487 A1 | 6/2010 |

* cited by examiner

USER EQUIPMENT, NETWORK SIDE DEVICE, AND METHOD FOR SENDING DPCCH

CROSS-REFERENCE TO RELATED APPLICATIONS

This application is a continuation of International Patent Application No. PCT/CN2014/072649 filed on Feb. 27, 2014, which is hereby incorporated by reference in the entirety.

TECHNICAL FIELD

The present invention relates to the field of communications, and in particular, to a user equipment, a network side device, and a method for sending a DPCCH.

BACKGROUND

Universal Mobile Telecommunications System (UMTS for short) is a mainstream 3G wireless communications standard formulated by the 3rd Generation Partnership Project (3GPP for short). To meet growing rate requirements of users, a high-speed packet access (HSPA for short) technology is introduced into the UMTS and used for improving spectral efficiency, and includes high speed downlink packet access (HSDPA for short) introduced in Release 5 and high speed uplink packet access (HSUPA for short) introduced in Release 6.

In 3GPP Release 7, a continuous packet connectivity (CPC for short) feature is introduced, and the feature allows a user equipment (UE for short) to perform discontinuous transmission (discontinuous transmission of an uplink dedicated physical control channel (DPCCH for short)) and discontinuous reception (HS-SCCH for short). Discontinuous transmission (DTX for short) is one of characteristics of the CPC feature, that is, when no data is transmitted, sending of an uplink DPCCH is stopped, which may reduce uplink interference on a network side device, and in a discontinuous transmission period of the UE, to maintain power control and link synchronization, the UE may regularly send a DPCCH pulse.

In 3GPP Release 8, a dual cell high speed downlink packet access (DC-HSDPA for short) feature is introduced, allowing the UE to receive data on two downlink carriers; in 3GPP Release 9, a dual cell high speed uplink packet access (DC-HSUPA for short) feature is introduced, allowing the UE to send data on two uplink carriers; and the DC-HSUPA is bound to the DC-HSDPA, that is, when the DC-HSUPA is configured for the UE, the DC-HSDPA is also definitely configured for the UE at the same time.

If the UE is configured with the DTX, when the UE is configured with the DC-HSUPA, for a conventional method for sending DPCCHs of uplink and downlink primary carriers and second carriers, reference may be made to FIG. 1, including: establishing and synchronizing a downlink dedicated channel; when establishment of the downlink dedicated channel is completed, after waiting for an activation time, continuously sending, by the UE, a DPCCH for a period to perform uplink dedicated channel synchronization; and after completing, by the UE, the establishment and synchronization of the downlink dedicated channel, and the uplink dedicated channel synchronization, discontinuously sending, by the UE, the DPCCH according to configured DTX parameters, so as to reduce UE power consumption and uplink interference.

3GPP Release 12 is researching a feature of further enhanced uplink enhancement, where one technology is that when uplink multi-carrier transmission is performed, high data rate transmission is supported; and the technology is implemented by scheduling, by the network side device during data sending, the UE by using a high rise over thermal noise (ROT for short) on a second carrier on which the UE is scheduled. To further improve transmission efficiency on an uplink second carrier, it may be implemented by enhancing the DTX to reduce transmission frequency of the DPCCH on the uplink second carrier, that is, when no data is transmitted, the DPCCH is periodically and discontinuously sent on the uplink second carrier according to the DTX parameters, for the network side device to maintain uplink synchronization and power control.

In a process of further improving transmission efficiency on the uplink second carrier by enhancing the DTX, because the high RoT is used to schedule the UE, interference of another UE to the scheduling of the UE needs to be avoided. If a conventional manner of sending a DPCCH is used on the uplink second carrier of the UE, a moment at which the UE sends the DPCCH is determined according to a moment at which the downlink dedicated channel is successfully established, which is not known by the network side device, and after the downlink dedicated channel is established, the UE continuously sends a DPCCH for a period for uplink dedicated channel synchronization, causing it difficult for the network side device to schedule another UE by using the high RoT.

SUMMARY

Embodiments of the present invention provide a user equipment, a network side device, and a method for sending a DPCCH, so as to implement that the network side device knows a moment at which a DPCCH is sent and a DPCCH is periodically sent.

To achieve the foregoing objective, the embodiments of the present invention use the following technical solutions:

According to a first aspect, a user equipment is provided, including:

a receiving unit, configured to receive indication information sent by a network side device;

an activation unit, configured to activate a second carrier of DC-HSUPA according to the indication information;

an acquisition unit, configured to acquire uplink DTX parameters; and a sending unit, configured to periodically send an uplink DPCCH on the second carrier of the DC-HSUPA according to the indication information and the uplink DTX parameters.

With reference to the first aspect, in a first possible implementation manner of the first aspect, the indication information includes:

Radio Resource Control (RRC for short) configuration information, where the RRC configuration information includes a frequency channel number of a second carrier of the UE DC-HSUPA, or the RRC configuration information includes the frequency channel number of the second carrier of the UE DC-HSUPA, and the uplink DTX parameters; or a downlink high speed shared control channel (HS-SCCH for short) command.

With reference to the first aspect or the first possible implementation manner of the first aspect, in a second possible implementation manner of the first aspect, the sending unit is specifically configured to:

after a time point at which the indication information is received, periodically send an uplink DPCCH on the second carrier of the DC-HSUPA by using a period and an offset that are indicated by the uplink DTX parameters.

With reference to the first aspect or the first possible implementation manner of the first aspect or the second possible implementation manner of the first aspect, in a third possible implementation manner of the first aspect, the indication information includes a time point at which the UE sends the uplink DPCCH.

With reference to the third possible implementation manner of the first aspect, in a fourth possible implementation manner of the first aspect, the sending unit is specifically configured to:

after the time point included in the indication information, periodically send an uplink DPCCH on the second carrier of the DC-HSUPA by using the period and the offset that are indicated by the uplink DTX parameters.

With reference to the first aspect or any one of the first possible implementation manner of the first aspect to the fourth possible implementation manner of the first aspect, in a fifth possible implementation manner of the first aspect, the sending unit is specifically configured to:

after a downlink dedicated channel of an primary carrier of the UE is established, periodically send an uplink DPCCH on the second carrier of the DC-HSUPA according to the indication information and the uplink DTX parameters;

or a primary carrier an uplink DPCCH of an primary carrier of the UE is continuously sent for a time specified by RRC, periodically send an uplink DPCCH on the second carrier of the DC-HSUPA according to the indication information and the uplink DTX parameters.

With reference to the first aspect or any one of the first possible implementation manner of the first aspect to the fifth possible implementation manner of the first aspect, in a sixth possible implementation manner of the first aspect, the user equipment further includes:

an interception unit, configured to intercept a corresponding downlink DPCCH or a corresponding downlink fractional dedicated physical channel (F-DPCH for short) at a moment when an uplink DPCCH is sent, where the downlink DPCCH or the downlink F-DPCH includes a power adjustment indication for the uplink DPCCH; and an adjustment unit, configured to adjust transmit power of the uplink DPCCH according to the power adjustment indication.

According to a second aspect, a network side device is provided, including:

a sending unit, configured to send indication information to a UE, so that the UE activates a second carrier of DC-HSUPA according to the indication information and periodically sends an uplink dedicated physical control channel DPCCH according to the indication information; and a receiving unit, configured to receive the uplink DPCCH periodically sent by the UE on the second carrier of the DC-HSUPA.

With reference to the second aspect, in a first possible implementation manner of the second aspect, the indication information includes:

RRC configuration information, where the RRC configuration information includes a frequency channel number of a second carrier of the UE DC-HSUPA, or the RRC configuration information includes the frequency channel number of the second carrier of the UE DC-HSUPA, and uplink DTX parameters; or a downlink HS-SCCH command.

With reference to the second aspect or the first possible implementation manner of the second aspect, in a second possible implementation manner of the second aspect, the indication information further includes:

a time point at which the UE sends the uplink DPCCH.

According to a third aspect, a method for sending a DPCCH is provided, including:

receiving indication information sent by a network side device;

activating a second carrier of DC-HSUPA according to the indication information;

acquiring uplink DTX parameters; and periodically sending an uplink DPCCH on the second carrier of the DC-HSUPA according to the indication information and the uplink DTX parameters.

With reference to the third aspect, in a first possible implementation manner of the third aspect, the indication information includes:

RRC configuration information, where the RRC configuration information includes a frequency channel number of a second carrier of UE DC-HSUPA, or the RRC configuration information includes the frequency channel number of the second carrier of the UE DC-HSUPA, and the uplink DTX parameters; or a downlink HS-SCCH command.

With reference to the third aspect or the first possible implementation manner of the third aspect, in a second possible implementation manner of the third aspect, the periodically sending an uplink DPCCH on the second carrier of the DC-HSUPA according to the indication information and the uplink DTX parameters includes:

after a time point at which the indication information is received, periodically sending an uplink DPCCH on the second carrier of the DC-HSUPA by using a period and an offset that are indicated by the uplink DTX parameters.

With reference to the third aspect or the first possible implementation manner of the third aspect or the second possible implementation manner of the third aspect, in a third possible implementation manner of the third aspect, the indication information includes a time point at which the UE sends the uplink DPCCH.

With reference to the third possible implementation manner of the third aspect, in a fourth possible implementation manner of the third aspect, the periodically sending an uplink DPCCH on the second carrier of the DC-HSUPA according to the indication information and the uplink DTX parameters includes:

after the time point included in the indication information, periodically sending an uplink DPCCH on the second carrier of the DC-HSUPA by using the period and the offset that are indicated by the uplink DTX parameters.

With reference to the third aspect or any one of the first possible implementation manner of the third aspect to the fourth possible implementation manner of the third aspect, in a fifth possible implementation manner of the third aspect, the periodically sending an uplink DPCCH on the second carrier of the DC-HSUPA according to the indication information and the uplink DTX parameters includes:

after a downlink dedicated channel of an primary carrier of the UE is established, periodically sending an uplink DPCCH on the second carrier of the DC-HSUPA according to the indication information and the uplink DTX parameters;

or after an uplink DPCCH of an primary carrier of the UE is continuously sent for a time specified by RRC, periodically sending an uplink DPCCH on the second carrier of the DC-HSUPA according to the indication information and the uplink DTX parameters.

With reference to the third aspect or any one of the first possible implementation manner of the third aspect to the fifth possible implementation manner of the third aspect, in a sixth possible implementation manner of the third aspect, the method further includes:

intercepting a corresponding downlink DPCCH or a corresponding downlink F-DPCH at a moment when an uplink DPCCH is sent, where the downlink DPCCH or the downlink F-DPCH includes a power adjustment indication for the uplink DPCCH; and adjusting transmit power of the uplink DPCCH according to the power adjustment indication.

According to a fourth aspect, a method for sending a DPCCH is provided, including:

sending indication information to a UE, so that the UE activates a second carrier of DC-HSUPA according to the indication information and periodically sends an uplink dedicated physical control channel DPCCH according to the indication information; and receiving the uplink DPCCH periodically sent by the UE on the second carrier of the DC-HSUPA.

With reference to the fourth aspect, in a first possible implementation manner of the fourth aspect, the indication information includes:

RRC configuration information, where the RRC configuration information includes a frequency channel number of a second carrier of UE DC-HSUPA, or the RRC configuration information includes the frequency channel number of the second carrier of the UE DC-HSUPA, and uplink DTX parameters; or a downlink HS-SCCH command.

With reference to the fourth aspect or the first possible implementation manner of the fourth aspect, in a second possible implementation manner of the fourth aspect, the indication information further includes:

a time point at which the UE sends the uplink DPCCH.

According to a fifth aspect, a user equipment is provided, including:

a receiver, configured to receive indication information sent by a network side device;

a processor, configured to activate a second carrier of DC-HSUPA according to the indication information, where the processor is further configured to acquire uplink DTX parameters; and a transmitter, configured to periodically send an uplink DPCCH on the second carrier of the DC-HSUPA according to the indication information and the uplink DTX parameters.

With reference to the fifth aspect, in a first possible implementation manner of the fifth aspect, the indication information includes:

RRC configuration information, where the RRC configuration information includes a frequency channel number of a second carrier of UE DC-HSUPA, or the RRC configuration information includes the frequency channel number of the second carrier of the UE DC-HSUPA, and the uplink DTX parameters; or a downlink HS-SCCH command.

With reference to the fifth aspect or the first possible implementation manner of the fifth aspect, in a second possible implementation manner of the fifth aspect, the transmitter is specifically configured to:

after a time point at which the indication information is received, periodically send an uplink DPCCH on the second carrier of the DC-HSUPA by using a period and an offset that are indicated by the uplink DTX parameters.

With reference to the fifth aspect or the first possible implementation manner of the fifth aspect or the second possible implementation manner of the fifth aspect, in a third possible implementation manner of the fifth aspect, the indication information includes a time point at which the UE sends the uplink DPCCH.

With reference to the third possible implementation manner of the fifth aspect, in a fourth possible implementation manner of the fifth aspect, the transmitter is specifically configured to:

after the time point included in the indication information, periodically send an uplink DPCCH on the second carrier of the DC-HSUPA by using the period and the offset that are indicated by the uplink DTX parameters.

With reference to the fifth aspect or any one of the first possible implementation manner of the fifth aspect to the fourth possible implementation manner of the fifth aspect, in a fifth possible implementation manner of the fifth aspect, the transmitter is specifically configured to:

after a downlink dedicated channel of an primary carrier of the UE is established, periodically send an uplink DPCCH on the second carrier of the DC-HSUPA according to the indication information and the uplink DTX parameters;

or after an uplink DPCCH of an primary carrier of the UE is continuously sent for a time specified by RRC, periodically send an uplink DPCCH on the second carrier of the DC-HSUPA according to the indication information and the uplink DTX parameters.

With reference to the fifth aspect or any one of the first possible implementation manner of the fifth aspect to the fifth possible implementation manner of the fifth aspect, in a sixth possible implementation manner of the fifth aspect, the processor is further configured to:

intercept a corresponding downlink DPCCH or a corresponding downlink F-DPCH at a moment when an uplink DPCCH is sent, where the downlink DPCCH or the downlink F-DPCH includes a power adjustment indication for the uplink DPCCH; and adjust transmit power of the uplink DPCCH according to the power adjustment indication.

According to a sixth aspect, a network side device is provided, including:

a transmitter, configured to send indication information to a UE, so that the UE activates a second carrier of DC-HSUPA according to the indication information and periodically sends an uplink dedicated physical control channel DPCCH according to the indication information; and a receiver, configured to receive the uplink DPCCH periodically sent by the UE on the second carrier of the DC-HSUPA.

With reference to the sixth aspect, in a first possible implementation manner of the sixth aspect, the indication information includes:

RRC configuration information, where the RRC configuration information includes a frequency channel number of a second carrier of UE DC-HSUPA, or the RRC configuration information includes the frequency channel number of the second carrier of the UE DC-HSUPA, and uplink DTX parameters; or a downlink high speed shared control channel HS-SCCH command.

With reference to the sixth aspect or the first possible implementation manner of the sixth aspect, in a second possible implementation manner of the sixth aspect, the indication information further includes:

a time point at which the UE sends the uplink DPCCH.

The present invention provides a user equipment, a network side device, and a method for sending a DPCCH. Indication information sent by a network side device is received; a second carrier of DC-HSUPA is activated according to the indication information; uplink DTX parameters are acquired; and an uplink DPCCH is periodically sent on the second carrier of the DC-HSUPA according to the indication information and the uplink DTX parameters, so that it is implemented that the network side device knows a moment at which a DPCCH is sent and a DPCCH is periodically sent according to the indication information, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions provided in the embodiments of the present invention may be applied to various wireless communications networks, such as a Global System for Mobile Communications (GSM for short) system, a Code Division Multiple Access (CDMA for short) system, a Wideband Code Division Multiple Access (WCDMA for short) system, a UMTS system, a general packet radio service (GPRS for short) system, a Long Term Evolution (LTE for short) system, a Long Term Evolution Advanced (LTE-A for short) system, and a Worldwide Interoperability for Microwave Access (WiMAX for short) system. The terms "network" and "system" can be interchanged.

In the embodiments of the present invention, a network side device may be a device that communicates with a UE or other communications sites, such as a repeater site, and the network side device may provide communications coverage of a specific physical area. For example, the network side device may be specifically a base transceiver station (BTS for short) or a base station controller (BSC for short) in GSM or CDMA; or may be a node B NB for short) in UMTS or a radio network controller (RNC for short) in UMTS; or may be further an evolved NodeB (ENB or e-base station for short) in LTE; or may be another access network device providing an access service in a wireless communications network, which is not limited in the present invention.

Figure 1:
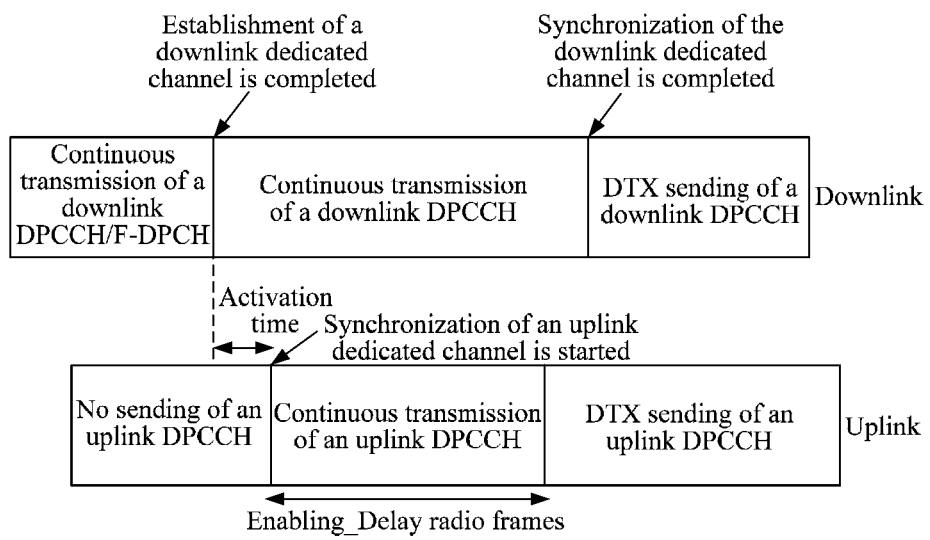
FIG. 1 is a schematic diagram of a scenario of a conventional method for sending a DPCCH in the prior art.

In a conventional manner of sending a DPCCH, if DTX is configured for a UE, when DC-HSUPA is being configured for the UE, for a method for sending DPCCHs of uplink and downlink primary carriers and second carriers, refer to FIG. 1, including: receiving, by the UE on a downlink anchor/second carrier, DPCCHs or F-DPCHs continuously sent by a network side device, so as to obtain establishment and synchronization of a downlink dedicated channel; when completing, by the UE, the establishment of the downlink dedicated channel, continuously sending, by the UE, DPCCHs during Enabling_Delay radio frames after waiting for a duration indicated by an activation time, so as to obtain uplink dedicated channel synchronization, where the activation time is a higher layer notification or is 0, and enabling delay is a higher layer notification; and after completing, by the UE, the establishment and synchronization of the downlink dedicated channel, and the uplink dedicated channel synchronization, discontinuously sending, by the UE, the DPCCH according to configured DTX parameters.

Embodiment 1

Figure 2:
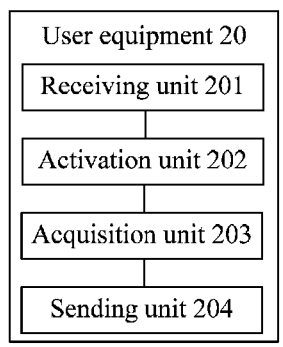
FIG. 2 is a schematic structural diagram of a user equipment according to an embodiment of the present invention.

Embodiment 1 of the present invention provides a user equipment 20. Referring to FIG. 2, the user equipment 20 may include:

a receiving unit 201, configured to receive indication information sent by a network side device, where the network side device may be a radio network controller (RNC for short) or a base station;

an activation unit 202, configured to activate a second carrier of DC-HSUPA according to the indication information;

an acquisition unit 203, configured to acquire uplink DTX parameters; and a sending unit 204, configured to periodically send an uplink DPCCH on the second carrier of the DC-HSUPA according to the indication information and the uplink DTX parameters.

The indication information may include any one of the following pieces of information:

1. RRC configuration information, where the RRC configuration information may include a frequency channel number of a second carrier of UE DC-HSUPA, or the RRC configuration information includes the frequency channel number of the second carrier of the UE DC-HSUPA, and the uplink DTX parameters, where when the indication information received by the receiving unit 201 includes the RRC configuration information, the activation unit 202 configures and activates the frequency channel number of the second carrier of the UE DC-HSUPA according to the indication information.

2. A downlink HS-SCCH command, where when indication information received by the receiving unit 201 includes the downlink HS-SCCH command, the activation unit 202 activates the configured frequency channel number of the second carrier of the UE DC-HSUPA according to the indication information.

It should be noted that the indication information not only may include the downlink HS-SCCH command that is used to activate the configured frequency channel number of the second carrier of the UE DC-HSUPA, but also may include other physical layer activation signaling that is used to activate the configured frequency channel number of the second carrier of the UE DC-HSUPA, which is not specifically limited in all embodiments of the present invention.

Specifically, the acquisition unit 203 may specifically use in any one of the following four manners according to content included in the indication information:

First manner: When the indication information includes the RRC configuration information, and the RRC configuration information may include the frequency channel number of the second carrier of the UE DC-HSUPA, the acquisition unit 203 acquires uplink DTX parameters from other RRC configuration information besides the indication information.

Second manner: When the indication information includes the RRC configuration information, and the RRC configuration information may include the frequency channel number of the second carrier of the UE DC-HSUPA, the acquisition unit 203 acquires uplink DTX parameters by retaining uplink DTX parameters of an primary carrier.

A third manner: When the indication information includes the RRC configuration information, and the RRC configuration information includes the frequency channel number of the second carrier of the UE DC-HSUPA, and the uplink DTX parameters, the acquisition unit 203 acquires uplink DTX parameters from the indication information.

A fourth manner: When the indication information includes the downlink HS-SCCH command, the acquisition unit 203 directly acquires a configured and activated uplink DTX parameter.

Certainly, when the indication information includes the downlink HS-SCCH command, and the acquisition unit 203 does not directly acquire a configured and activated uplink DTX parameter, it indicates that the UE is not configured with a DTX mode on an uplink second carrier, and therefore, the present invention does not involve a case in which a DPCCH is continuously sent on the uplink second carrier of the UE or a DPCCH is not periodically sent on the uplink second carrier.

It should be noted that the manner of acquiring uplink DTX by the acquisition unit 203 may include but is not limited to the foregoing four manners, which is not specifically limited in all embodiments of the present invention.

Further, sending of an uplink DPCCH may be indicated by indication information according to different network configurations; and sending of an uplink DPCCH by the sending unit 204 according to the indication information may specifically include the following two manners:

First manner: After a time point at which the indication information is received, an uplink DPCCH is periodically sent on the second carrier of the DC-HSUPA by using a period and an offset that are indicated by the uplink DTX parameters.

It should be noted that the after a time point at which the indication information is received may be immediately at the time point at which the indication information is received, or may be after a time point obtained by adding a predefined time to the time point at which the indication information is received; and a specific definition of the after a time point at which the indication information is received, and the predefined time both may be determined according to an actual requirement, which is not specifically limited in all embodiments of the present invention.

When a network configures that the UE sends an uplink DPCCH immediately when receiving the indication information, the UE periodically sends, starting from a time point at which the indication information is received, an uplink DPCCH on the second carrier of the DC-HSUPA by using a period and an offset that are indicated by the uplink DTX parameters.

When a network configures that the UE sends an uplink DPCCH after receiving the indication information, and the predefined time is T, the UE periodically sends, after the time point at which the indication information is received and waiting for a duration T, an uplink DPCCH on the second carrier of the DC-HSUPA by using the period and the offset that are indicated by the uplink DTX parameters.

Second manner: When the indication information includes the time point at which the UE sends the uplink DPCCH, after the time point included in the indication information, an uplink DPCCH is periodically sent on the second carrier of the DC-HSUPA by using the period and the offset that are indicated by the uplink DTX parameters.

When it is agreed in a network agreement that the UE sends an uplink DPCCH at a time point indicated by the indication information, and the indication information includes the time point at which the UE sends the uplink DPCCH, the UE periodically sends, after the time point included in the indication information, an uplink DPCCH on the second carrier of the DC-HSUPA by using the period and the offset that are indicated by the uplink DTX parameters.

The uplink DTX parameters may include the period and the offset, where the period is used to indicate a time interval at which an uplink DPCCH is periodically sent, and the offset is used to indicate a start moment at which a first uplink DPCCH is sent; for example, assuming that the uplink DTX parameters include a period 40 ms, and an offset 10 ms, then the uplink DPCCH is periodically sent at the $10^{th}$ ms, the $50^{th}$ ms, and the $90^{th}$ ms, . . . .

The period included in the uplink DTX parameters may be multiple periods that have different lengths, for example, the uplink DTX parameters include a first period, and a second period, where the first period<the second period; when an uplink DPCCH is sent according to the uplink DTX parameters, an uplink DPCCH is first sent according to the first period that has a minimum length; and when an uplink DPCCH is sent by using the first period, if there is no uplink data transmission within an inactive threshold according to a statistics test, an uplink DPCCH is sent by using the second period.

It should be noted that content included in the uplink DTX parameters, a specific value of the content, and a width of the inactive threshold all may be determined according to an actual requirement, which is not specifically limited in this embodiment of the present invention.

Optionally, the indication information may further include a time point at which the UE sends the uplink DPCCH.

Further, when the UE receives the indication information, if the UE has not completed synchronization on an uplink primary carrier, the sending unit 204 may be further and specifically configured to:

after a downlink dedicated channel of an primary carrier of the UE is established, periodically send an uplink DPCCH on the second carrier of the DC-HSUPA according to the indication information and the uplink DTX parameters; or after an uplink DPCCH of an primary carrier of the UE is continuously sent for a time specified by RRC, periodically send an uplink DPCCH on the second carrier of the DC-HSUPA according to the indication information and the uplink DTX parameters.

Figure 3:
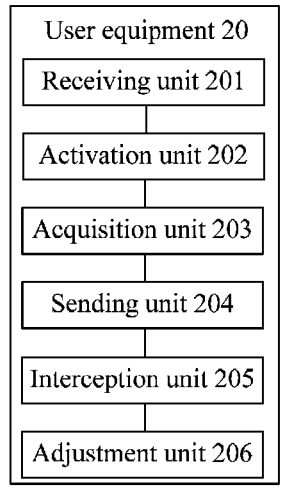
FIG. 3 is a schematic structural diagram of another user equipment according to an embodiment of the present invention.

Further, referring to FIG. 3, the user equipment 20 may further include:

an interception unit 205, configured to intercept a corresponding downlink DPCCH or a corresponding downlink F-DPCH at a moment when an uplink DPCCH is sent, where the downlink DPCCH or the downlink F-DPCH includes a power adjustment indication for the uplink DPCCH, where the power adjustment indication for the uplink DPCCH is determined and delivered by the network side device; for example, assuming that power with which the UE sends an uplink DPCCH at a first moment is −11 dBm, and after receiving the uplink DPCCH, the network side device compares the power −11 dBm with an available threshold (−10) dBm, and determines that transmit power of the uplink DPCCH is small and needs to be enlarged, a power adjustment indication "enlarge" of the uplink DPCCH is delivered by using a downlink DPCCH or a downlink F-DPCH; and the UE acquires the power adjustment indication "enlarge" of the uplink DPCCH by intercepting a corresponding downlink DPCCH or a corresponding downlink F-DPCH; and an adjustment unit 206, configured to adjust transmit power of the uplink DPCCH according to the power adjustment indication;

for example, the UE enlarges the transmit power of the uplink DPCCH by X according to the power adjustment indication "enlarge", where X is an adjustment amount agreed in a network agreement, and a specific value of X is not limited in the present invention, and may be determined according to an actual requirement.

This embodiment of the present invention provides a user equipment 20, which receives indication information sent by a network side device; activates a second carrier of DC-HSUPA according to the indication information; acquires uplink DTX parameters; and periodically sends an uplink DPCCH on the second carrier of the DC-HSUPA according to the indication information and the uplink DTX parameters, so that it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

Embodiment 2

Figure 4:
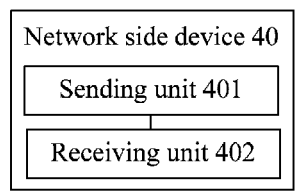
FIG. 4 is a schematic structural diagram of a network side device according to an embodiment of the present invention.

Embodiment 2 of the present invention provides a network side device 40. Referring to FIG. 4, the network side device 40 may include:

a sending unit 401, configured to send indication information to a UE, so that the UE activates a second carrier of DC-HSUPA according to the indication information and the UE periodically sends an uplink DPCCH according to the indication information; and a receiving unit 402, configured to receive the uplink DPCCH periodically sent by the UE on the second carrier of the DC-HSUPA.

Optionally, the network side device 40 may be an RNC or a base station, which is not specifically limited in the present invention.

The indication information may include either one of the following two types of information:

First type of information: RRC configuration information, where the RRC configuration information includes a frequency channel number of a second carrier of UE DC-HSUPA, or the RRC configuration information includes the frequency channel number of the second carrier of the UE DC-HSUPA, and uplink discontinuous transmission DTX parameters, where when the indication information includes the RRC configuration information, and the RRC configuration information includes the frequency channel number of the second carrier of the UE DC-HSUPA, the indication information is used to instruct the UE to configure and activate the frequency channel number of the second carrier of the UE DC-HSUPA; and when the indication information includes the RRC configuration information, and the RRC configuration information includes the frequency channel number of the second carrier of the UE DC-HSUPA, and the uplink DTX parameters, the indication information is used to instruct the UE to configure and activate the frequency channel number of the second carrier of the UE DC-HSUPA, and the uplink DTX parameters.

Second type of information: a downlink HS-SCCH command, where when the indication information includes the downlink HS-SCCH command, the indication information is used to instruct the UE to activate a configured frequency channel number of a second carrier of the DC-HSUPA.

It should be noted that specific content included in the indication information may be determined according to an actual requirement, and the content included in the indication information is not specifically limited in the present invention.

Optionally, the indication information may further include:

a time point at which the UE sends the uplink DPCCH, where the time point is used to indicate a moment at which the UE sends the uplink DPCCH.

The present invention provides a network side device 40, which sends indication information to a UE, so that the UE activates a second carrier of DC-HSUPA, and therefore, it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends DPCCH for a period for uplink dedicated channel synchronization, causing it difficult for the network side device to schedule another UE by using a high RoT.

Embodiment 3

Figure 5:
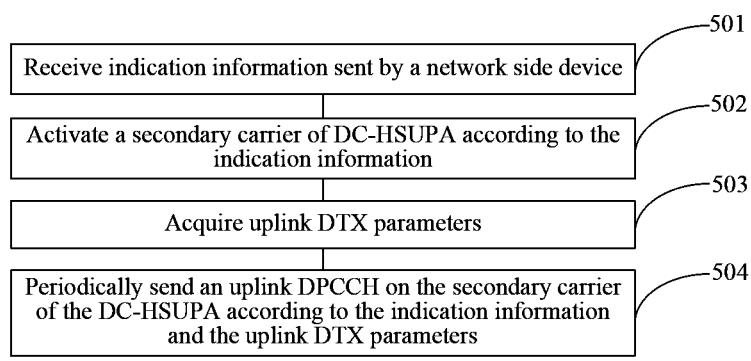
FIG. 5 is a schematic flowchart of a method for sending a DPCCH according to an embodiment of the present invention.

Embodiment 3 of the present invention provides a method for sending a DPCCH. Referring to FIG. 5, the method may include the following steps:

501. Receive indication information sent by a network side device.

The indication information may include either one of the following types of information:

1. RRC configuration information, where the RRC configuration information may include a frequency channel number of a second carrier of UE DC-HSUPA or the RRC configuration information may include the frequency channel number of the second carrier of the UE DC-HSUPA, and uplink DTX parameters.

2. A downlink HS-SCCH command.

It should be noted that the indication information not only may include the downlink HS-SCCH command that is used to activate the configured frequency channel number of the second carrier of the UE DC-HSUPA, but also may include other physical layer activation signaling that is used to activate the configured frequency channel number of the second carrier of the UE DC-HSUPA, which is not specifically limited in all embodiments of the present invention.

502. Activate a second carrier of DC-HSUPA according to the indication information.

According to different content included in the indication information, the following two manners of activating a second carrier of DC-HSUPA may be included:

First manner: When the indication information includes the RRC configuration information, the frequency channel number of the second carrier of the UE DC-HSUPA is configured and activated according to the indication information.

Second manner: When the indication information includes the downlink HS-SCCH command, the configured frequency channel number of the second carrier of the UE DC-HSUPA is activated according to the indication information.

503. Acquire uplink DTX parameters.

According to content included in the indication information, the uplink DTX parameters may be specifically acquired in any one of the following four manners:

First manner: When the indication information includes the RRC configuration information, and the RRC configuration information may include the frequency channel number of the second carrier of the UE DC-HSUPA, uplink DTX parameters are acquired from other RRC configuration information except the RRC configuration information included in the indication information.

Second manner: When the indication information includes RRC configuration information, and the RRC configuration information includes only the frequency channel number of the second carrier of the UE DC-HSUPA, uplink DTX parameters are acquired by continuing to use uplink DTX parameters of an primary carrier.

Third manner: When the indication information includes the RRC configuration information, and the RRC configuration information may include the frequency channel number of the second carrier of the UE DC-HSUPA, and the uplink DTX parameters, the uplink DTX parameters are acquired from the indication information.

Fourth manner: When the indication information includes the downlink HS-SCCH command, a configured and activated uplink DTX parameter is directly acquired.

Certainly, when the indication information includes the downlink HS-SCCH command, and no configured and activated uplink DTX parameter is acquired, it indicates that the UE is not configured with a DTX mode on an uplink second carrier, and therefore, the present invention does not involve a case in which a DPCCH is continuously sent on the uplink second carrier of the UE or a DPCCH is not periodically sent on the uplink second carrier.

It should be noted that the manner of acquiring uplink DTX may include but is not limited to the foregoing four manners, which is not specifically limited in all embodiments of the present invention.

504. Periodically send an uplink DPCCH on the second carrier of the DC-HSUPA according to the indication information and the uplink DTX parameters.

Sending of an uplink DPCCH may be indicated by indication information according to different network agreements; and sending of an uplink DPCCH according to the indication information may specifically include the following two manners:

First manner: After a time point at which the indication information is received, an uplink DPCCH is periodically sent on the second carrier of the DC-HSUPA by using a period and an offset that are indicated by the uplink DTX parameters.

It should be noted that the after a time point at which the indication information is received may be immediately at the time point at which the indication information is received, or may be after a time point obtained by adding a predefined time to the time point at which the indication information is received; and a specific definition of the after a time point at which the indication information is received, and the predefined time both may be determined according to an actual requirement, which is not specifically limited in all embodiments of the present invention.

When it is agreed in a network agreement that the UE sends an uplink DPCCH immediately when receiving the indication information, the UE periodically sends, starting from a time point at which the indication information is received, an uplink DPCCH on the second carrier of the DC-HSUPA by using a period and an offset that are indicated by the uplink DTX parameters.

When it is agreed in a network agreement that the UE sends an uplink DPCCH after receiving the indication information, and the predefined time is T, the UE periodically sends, after the time point at which the indication information is received and waiting for a duration T, an uplink DPCCH on the second carrier of the DC-HSUPA by using the period and the offset that are indicated by the uplink DTX parameters.

Second manner: When the indication information includes the time point at which the UE sends the uplink DPCCH, after the time point included in the indication information, an uplink DPCCH is periodically sent on the second carrier of the DC-HSUPA by using the period and the offset that are indicated by the uplink DTX parameters.

When it is agreed in a network agreement that the UE sends an uplink DPCCH at a time point indicated by the indication information, and the indication information includes the time point at which the UE sends the uplink DPCCH, the UE periodically sends, after the time point included in the indication information, an uplink DPCCH on the second carrier of the DC-HSUPA by using the period and the offset that are indicated by the uplink DTX parameters.

The uplink DTX parameters may include the period and the offset, where the period is used to indicate a time interval at which an uplink DPCCH is periodically sent, and the offset is used to indicate a start moment at which a first uplink DPCCH is sent; for example, assuming that the uplink DTX parameters include a period 40 ms, and an offset 10 ms, then the uplink DPCCH is periodically sent at the $10^{th}$ ms, the $50^{th}$ ms, and the $90^{th}$ ms, . . . .

The period included in the uplink DTX parameters may be multiple periods that have different lengths, for example, the uplink DTX parameters include a first period, and a second period, where the first period<the second period; when an uplink DPCCH is sent according to the uplink DTX parameters, an uplink DPCCH is first sent according to the first period that has a minimum length; and when an uplink DPCCH is sent by using the first period, if there is no uplink data transmission within an inactive threshold according to a statistics test, an uplink DPCCH is sent by using the second period.

It should be noted that content included in the uplink DTX parameters, a specific value of the content, and a width of the inactive threshold all may be determined according to an actual requirement, which is not specifically limited in this embodiment of the present invention.

Further, when the UE receives the indication information, if the UE has not completed synchronization on an uplink primary carrier, then an uplink DPCCH may be periodically sent on the second carrier of the DC-HSUPA according to the indication information and the uplink DTX parameters in either one of the following two manners:

First manner: After a downlink dedicated channel of an primary carrier of the UE is established, an uplink DPCCH is periodically sent on the second carrier of the DC-HSUPA according to the indication information and the uplink DTX parameters.

Second manner: After an uplink DPCCH of an primary carrier of the UE is continuously sent for a time specified by RRC, an uplink DPCCH is periodically sent on the second carrier of the DC-HSUPA according to the indication information and the uplink DTX parameters.

Further, the method may further include:

intercepting a corresponding downlink DPCCH or a corresponding downlink fractional dedicated physical channel F-DPCH at a moment when an uplink DPCCH is sent, where the downlink DPCCH or the downlink F-DPCH includes a power adjustment indication for the uplink DPCCH; and adjusting transmit power of the uplink DPCCH according to the power adjustment indication.

It should be noted that for a process of adjusting transmit power of an uplink DPCCH, details are already described in Embodiment 1 and are not described herein again.

This embodiment of the present invention provides a method for sending a DPCCH. Indication information sent by a network side device is received; a second carrier of DC-HSUPA is activated according to the indication information; uplink DTX parameters are acquired; and an uplink DPCCH is periodically sent on the second carrier of the DC-HSUPA according to the indication information and the uplink DTX parameters, so that it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

Embodiment 4

Figure 6:
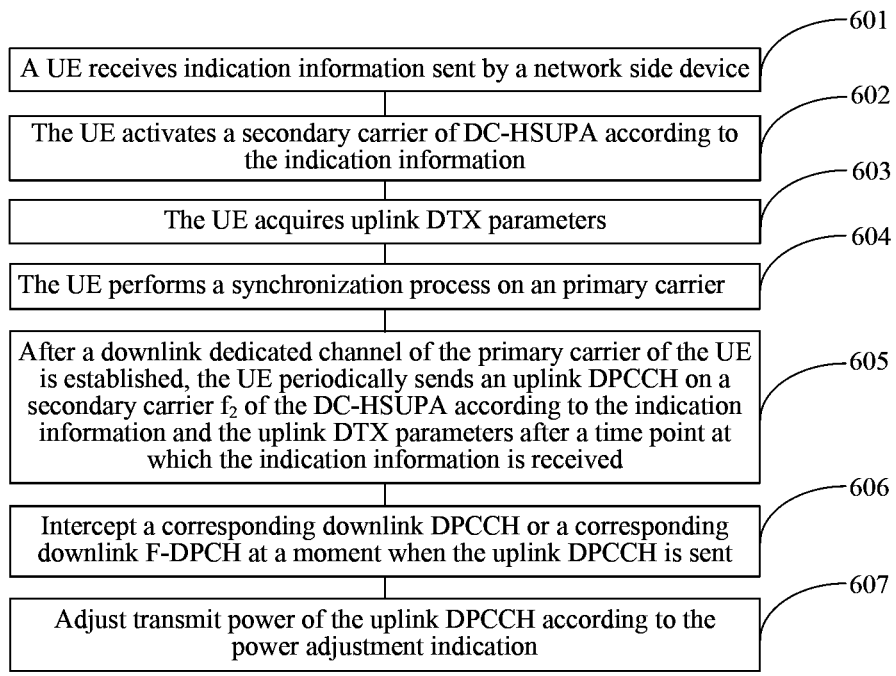
FIG. 6 is a schematic flowchart of another method for sending a DPCCH according to an embodiment of the present invention.

Embodiment 4 of the present invention provides another method for sending a DPCCH. The method for sending a DPCCH shown in FIG. 6 is described in detail by using an example in which when a UE receives indication information, synchronization is not yet completed on an uplink primary carrier of the UE.

It is assumed that the UE works in a DC-HSDPA mode, and frequency channel numbers separately are a downlink $f_1$, a downlink $f_2$, and an uplink $f_1$. Referring to FIG. 6, the method may include the following steps:

601. The UE receives indication information sent by a network side device.

The indication information may include RRC configuration information, where the RRC configuration information includes a frequency channel number of a second carrier of UE DC-HSUPA, and uplink DTX parameters.

It is assumed that the frequency channel number of the second carrier of the UE DC-HSUPA included in the RRC configuration information is $f_2$; uplink DTX parameters included in the RRC configuration information are a first period (8 ms), a second period (16 ms), and an offset (6).

602. The UE activates a second carrier of DC-HSUPA according to the indication information.

For example, the UE configures and activates the frequency channel number $f_2$ of the second carrier of the UE DC-HSUPA according to the indication information.

603. The UE acquires uplink DTX parameters.

If the indication information includes the uplink DTX parameters, the UE may directly acquire the uplink DTX parameters from the indication information according to content included in the indication information.

For example, the UE acquires, from the indication information, uplink DTX parameters, that is, a first period (8 ms), a second period (16 ms), and an offset (6).

604. The UE performs a synchronization process on an primary carrier.

The UE may perform a synchronization process on a primary carrier $f_1$ in the manner shown in FIG. 1.

605. After a downlink dedicated channel of the primary carrier of the UE is established, the UE periodically sends an uplink DPCCH on a second carrier $f_2$ of the DC-HSUPA according to the indication information and the uplink DTX parameters after a time point at which the indication information is received.

Figure 7:
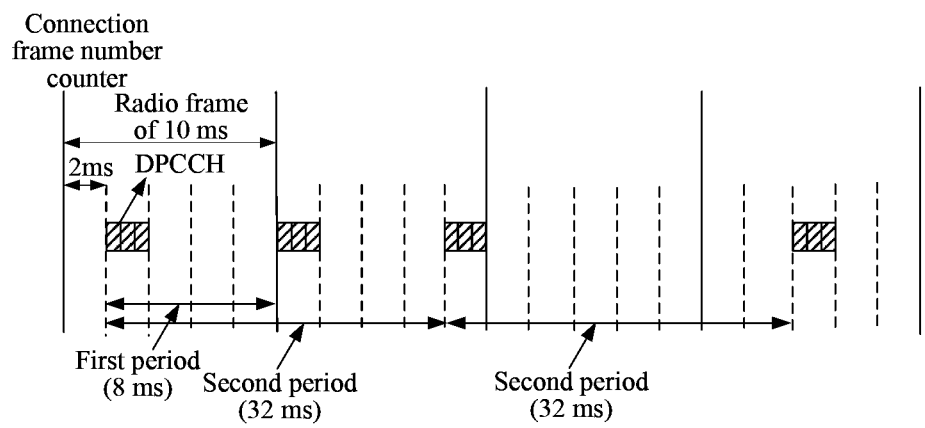
FIG. 7 is a schematic diagram of a scenario of a moment at which a DPCCH is sent according to an embodiment of the present invention.

It is assumed that the DPCCH is activated at E-DCH TTI 2 ms. Referring to FIG. 7, a moment at which an uplink DPCCH of the UE is sent is illustrated.

606. Intercept a corresponding downlink DPCCH or a corresponding downlink F-DPCH at a moment when the uplink DPCCH is sent.

The downlink DPCCH or the downlink F-DPCH includes a power adjustment indication for the uplink DPCCH.

607. Adjust transmit power of the uplink DPCCH according to the power adjustment indication.

It should be noted that for a process of adjusting transmit power of an uplink DPCCH, details are already described in Embodiment 1 and are not described herein again.

This embodiment of the present invention provides a method for sending a DPCCH. Indication information sent by a network side device is received; a second carrier of DC-HSUPA is activated according to the indication information; uplink DTX parameters are acquired; a UE performs a synchronization process on an primary carrier; and an uplink DPCCH is periodically sent on the second carrier of the DC-HSUPA according to the indication information and the uplink DTX parameters, so that it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

Embodiment 5

Figure 8:
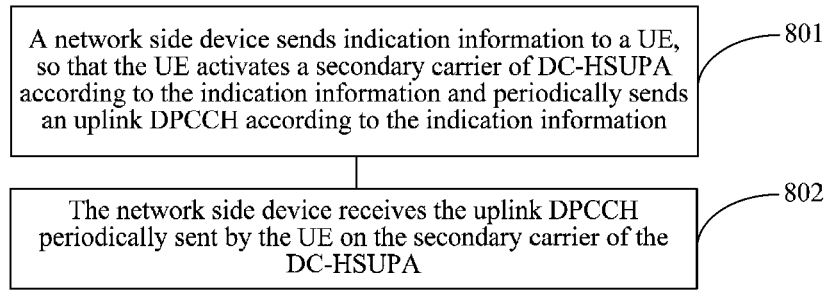
FIG. 8 is a schematic flowchart of still another method for sending a DPCCH according to an embodiment of the present invention.

Embodiment 5 of the present invention provides a method for sending a DPCCH. Referring to FIG. 8, the method may include:

801. A network side device sends indication information to a UE, so that the UE activates a second carrier of DC-HSUPA according to the indication information and periodically sends an uplink DPCCH according to the indication information.

The network side device may be an RNC or a base station; in this case, the indication information may be sent by the RNC or sent by the base station, and a type of the network side device is not specifically limited in the present invention.

The indication information may include either one of the following two types of information:

First type of information: RRC configuration information, where the RRC configuration information may include a frequency channel number of a second carrier of UE DC-HSUPA or the RRC configuration information may include the frequency channel number of the second carrier of the UE DC-HSUPA, and uplink DTX parameters, where when the indication information includes the RRC configuration information, and the RRC configuration information includes the frequency channel number of the second carrier of the UE DC-HSUPA, the indication information is used to instruct the UE to configure and activate the frequency channel number of the second carrier of the UE DC-HSUPA; and when the indication information includes the RRC configuration information, and the RRC configuration information includes the frequency channel number of the second carrier of the UE DC-HSUPA, and the uplink DTX parameters, the indication information is used to instruct the UE to configure and activate the frequency channel number of the second carrier of the UE DC-HSUPA, and the uplink DTX parameters.

Second type of information: a downlink HS-SCCH command, where when the indication information includes the downlink HS-SCCH command, the indication information is used to instruct the UE to activate a configured frequency channel number of a second carrier of the DC-HSUPA.

It should be noted that specific content included in the indication information may be determined according to an actual requirement, and the content included in the indication information is not specifically limited in the present invention.

Optionally, the indication information may further include:

a time point at which the UE sends the uplink DPCCH, where the time point is used to indicate a moment at which the UE sends the uplink DPCCH.

802. The network side device receives the uplink DPCCH periodically sent by the UE on the second carrier of the DC-HSUPA.

The present invention provides a method for sending a DPCCH. Indication information is sent to a UE, so that the UE activates a second carrier of DC-HSUPA according to the indication information and periodically sends an uplink DPCCH according to the indication information, and therefore, it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

Embodiment 6

Figure 9:
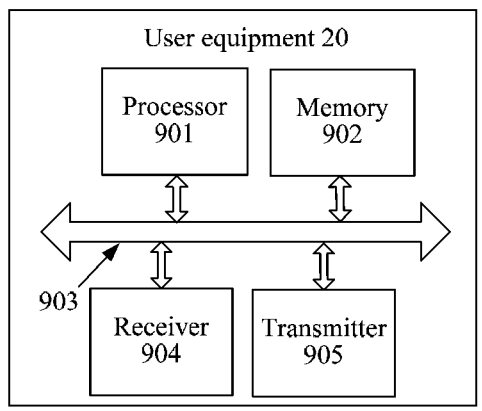
FIG. 9 is a schematic structural diagram of another user equipment according to an embodiment of the present invention.

Embodiment 6 of the present invention provides a user equipment 20, configured to implement the methods for sending a DPCCH described in Embodiment 3 and Embodiment 4. Referring to FIG. 9, the user equipment 20 may include:

at least one processor 901; a memory 902; at least one communications bus 903, configured to implement connection and mutual communication between the processor 901, the memory 902, and other modules that are not shown; a receiver 904; and a transmitter 905.

The communications bus 903 may be an Industry Standard Architecture (ISA for short) bus, a Peripheral Component Interconnect (PCI for short) bus, or an Extended Industry Standard Architecture (EISA for short) bus, or the like. The bus 903 may be classified into an address bus, a data bus, a control bus, or the like. For ease of indication, FIG. 9 only uses a bold line for indication, but it does not indicate that there is only one bus or only a type of bus.

The memory 902 may be a random access memory, and provides an instruction and data for the processor 901. A part of the memory 902 may further include a non-volatile random access memory (NVRAM). The memory 902 may be configured to store all information included in a distributed lock management device in a distributed lock management process.

The processor 901 may be a central processing unit (CPU for short), or is an application-specific integrated circuit (ASIC for short), or is configured to implement one or more integrated circuits of an embodiment of the present invention.

The receiver 904 and the transmitter 905 may be antennas of the UE.

The receiver 904 is configured to receive indication information sent by a network side device;

the processor 901 is configured to activate a second carrier of DC-HSUPA according to the indication information;

the processor 901 may be further configured to acquire uplink DTX parameters; and the transmitter 905 is configured to periodically send an uplink DPCCH on the second carrier of the DC-HSUPA according to the indication information and the uplink DTX parameters.

Optionally, the indication information may include:

RRC configuration information, where the RRC configuration information may include a frequency channel number of a second carrier of UE DC-HSUPA or the RRC configuration information may include the frequency channel number of the second carrier of the UE DC-HSUPA, and the uplink DTX parameters; or a downlink HS-SCCH command.

Further, the transmitter 905 may be specifically configured to:

after a time point at which the indication information is received, periodically send an uplink DPCCH on the second carrier of the DC-HSUPA by using a period and an offset that are indicated by the uplink DTX parameters.

For description of operations after a time point of the indication information, details are described in Embodiment 1 and are not described herein again.

Optionally, the indication information may include a time point at which the UE sends the uplink DPCCH.

Further, the transmitter 905 may be specifically configured to:

after the time point included in the indication information, periodically send an uplink DPCCH on the second carrier of the DC-HSUPA by using the period and the offset that are indicated by the uplink DTX parameters.

Optionally, the transmitter 905 may be specifically configured to:

after a downlink dedicated channel of an primary carrier of the UE is established, periodically send an uplink DPCCH on the second carrier of the DC-HSUPA according to the indication information and the uplink DTX parameters;

or after an uplink DPCCH of an primary carrier of the UE is continuously sent for a time specified by RRC, periodically send an uplink DPCCH on the second carrier of the DC-HSUPA according to the indication information and the uplink DTX parameters.

Further, the processor 901 may be further configured to:

intercept a corresponding downlink DPCCH or a corresponding downlink F-DPCH at a moment when an uplink DPCCH is sent, where the downlink DPCCH or the downlink F-DPCH includes a power adjustment indication for the uplink DPCCH; and adjust transmit power of the uplink DPCCH according to the power adjustment indication.

This embodiment of the present invention provides a user equipment 20, which receives indication information sent by a network side device; activates a second carrier of DC-HSUPA according to the indication information; acquires uplink DTX parameters; and periodically sends an uplink DPCCH on the second carrier of the DC-HSUPA according to the indication information and the uplink DTX parameters, so that it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

Embodiment 7

Figure 10:
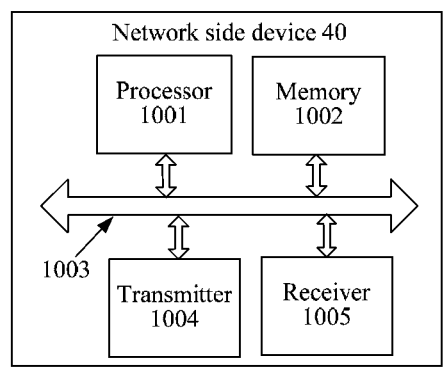
FIG. 10 is a schematic structural diagram of another network side device according to an embodiment of the present invention.

Embodiment 7 of the present invention provides a network side device 40, configured to implement the method for sending a DPCCH described in Embodiment 5. Referring to FIG. 10, the network side device 40 may include:

at least one processor 1001; a memory 1002; at least one communications bus 1003, configured to implement connection and mutual communication between the processor 1001, the memory 1002, and other modules that are not shown; a transmitter 1004; and a receiver 1005.

The communications bus 1003 may be an Industry Standard Architecture (ISA for short) bus, a Peripheral Component Interconnect (PCI for short) bus, or an extended Industry Standard Architecture (Extended Industry Standard Architecture, EISA for short) bus, or the like. The bus 1003 may be classified into an address bus, a data bus, a control bus, or the like. For ease of indication, FIG. 10 only uses a bold line for indication, but it does not indicate that there is only one bus or only a type of bus.

The memory 1002 may be a random access memory, and provides an instruction and data for the processor 1001. A part of the memory 1002 may further include a non-volatile random access memory (NVRAM). The memory 1002 may be configured to store all information included in a distributed lock management device in a distributed lock management process.

The processor 1001 may be a central processing unit (CPU for short), or is an application-specific integrated circuit (ASIC for short), or is configured to implement one or more integrated circuits of an embodiment of the present invention.

The transmitter 1004 and the receiver 1005 may be antennas of the network side device.

The transmitter 1004 is configured to send indication information to a UE, so that the UE activates a second carrier of DC-HSUPA according to the indication information and periodically sends an uplink DPCCH according to the indication information.

The receiver 1005 is configured to receive the uplink DPCCH periodically sent by the UE on the second carrier of the DC-HSUPA.

Optionally, the indication information may include:

RRC configuration information, where the RRC configuration information may include a frequency channel number of a second carrier of UE DC-HSUPA or the RRC configuration information may include the frequency channel number of the second carrier of the UE DC-HSUPA, and uplink DTX parameters; or a downlink HS-SCCH command.

Optionally, the indication information may further include:

a time point at which the UE sends the uplink DPCCH.

The present invention provides a network side device 40, which sends indication information to a UE, so that the UE activates a second carrier of DC-HSUPA according to the indication information and periodically sends an uplink DPCCH according to the indication information; and therefore, it is implemented that the network side device knows a moment at which a DPCCH is sent and a DPCCH is periodically sent, thereby solving defects in the prior art that the network side device does not know the moment at which the DPCCH is sent, and that after a downlink dedicated channel is established, the UE continuously sends a DPCCH for a period for uplink dedicated channel synchronization, causing it difficult for the network side device to schedule another UE by using a high RoT.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A user equipment, comprising:
   a receiver, configured to receive indication information sent by a network side device;
   a processor, configured to activate a second carrier of dual cell high speed uplink packet access (DC-HSUPA) according to the indication information, and to acquire uplink discontinuous transmission (DTX) parameters; and
   a transmitter, configured to periodically send an uplink dedicated physical control channel (DPCCH) on the second carrier of the DC-HSUPA according to the indication information and the uplink DTX parameters, wherein the indication information comprises a time point before which the transmitter is prohibited from sending the uplink DPCCH on the second carrier of the DC-HSUPA.

2. The user equipment according to claim 1, wherein the indication information comprises:
   a downlink high speed shared control channel (HS-SCCH) command.

3. The user equipment according to claim 1, wherein the transmitter is configured to:
   after the time point, periodically send the uplink DPCCH on the second carrier of the DC-HSUPA by using a period and an offset that are indicated by the uplink DTX parameters.

4. The user equipment according to claim 1, wherein the transmitter is configured to:
   at the time point, immediately send the DPCCH on the second carrier of the DC-HSUPA according to the indication information and the uplink DTX parameters.

5. The user equipment according to claim 1, wherein the transmitter is configured to:
   waiting for a predefined time after the time point, sending the DPCCH on the second carrier of the DC-HSUPA according to the indication information and the uplink DTX parameters.

6. A network side device, comprising:
   a transmitter, configured to send indication information to a user equipment (UE), wherein the indication information indicates the UE activates a second carrier of DC-HSUPA and periodically sends a DPCCH; and
   a receiver, configured to receive the uplink DPCCH periodically sent by the UE on the second carrier of the DC-HSUPA,
   wherein the indication information comprises a time point before which the UE is prohibited from sending the uplink DPCCH on the second carrier of the DC-HSUPA.

7. The network side device according to claim 6, wherein the indication information comprises:
   a downlink HS-SCCH command.

8. The network side device according to claim 6, wherein the time point indicates the UE to immediately send the DPCCH on the second carrier of the DC-HSUPA according to the indication information and the uplink DTX parameters.

9. The network side device according to claim 6, wherein the indication information indicates the UE wait for a predefined time after the time point to send the DPCCH on the second carrier of the DC-HSUPA according to the indication information and the uplink DTX parameters.

10. A method for sending a DPCCH, comprising:
    receiving, by a UE, indication information sent by a network side device;
    activating, by the UE, a second carrier of DC-HSUPA according to the indication information;
    acquiring, by the UE, uplink DTX parameters; and
    periodically sending, by the UE, a DPCCH on the second carrier of the DC-HSUPA according to the indication information and the uplink DTX parameters,
    wherein the indication information comprises a time point before which the UE is prohibited from sending the uplink DPCCH on the second carrier of the DC-HSUPA.

11. The method according to claim 10, wherein the indication information comprises:
    a downlink HS-SCCH command.

12. The method according to claim 10, wherein the periodically sending an uplink DPCCH on the second carrier of the DC-HSUPA according to the indication information and the uplink DTX parameters comprises:

after the time point at which the indication information is received, periodically sending an uplink DPCCH on the second carrier of the DC-HSUPA by using a period and an offset that are indicated by the uplink DTX parameters.

13. The method according to claim 10, wherein the periodically sending the uplink DPCCH on the second carrier of the DC-HSUPA comprises:
at the time point, immediately send the DPCCH on the second carrier of the DC-HSUPA according to the indication information and the uplink DTX parameters.

14. The method according to claim 10, wherein the periodically sending the uplink DPCCH on the second carrier of the DC-HSUPA comprises:
waiting for a predefined time after the time point to send the DPCCH on the second carrier of the DC-HSUPA according to the indication information and the uplink DTX parameters.

15. The method according to claim, 10, wherein the method further comprises:
intercepting a corresponding downlink DPCCH or a corresponding downlink fractional dedicated physical channel (F-DPCH) at a moment when an uplink DPCCH is sent, wherein the downlink DPCCH or the downlink F-DPCH comprises a power adjustment indication for the uplink DPCCH; and
adjusting transmit power of the uplink DPCCH according to the power adjustment indication.

16. A method for sending a DPCCH, comprising:
sending indication information to a UE, wherein the indication information indicates the UE activates a second carrier of dual cell high speed uplink packet access DC-HSUPA and periodically sends an uplink dedicated physical control channel DPCCH; and
receiving the uplink DPCCH periodically sent by the UE on the second carrier of the DC-HSUPA,
wherein the indication information comprises a time point before which the UE is prohibited from sending the uplink DPCCH on the second carrier of the DC-HSUPA.

17. The method according to claim 16, wherein the indication information comprises:
a downlink HS-SCCH command.

18. The method according to claim 16, wherein the indication information indicates the UE, at the time point, immediately send the DPCCH on the second carrier of the DC-HSUPA according to the indication information and the uplink DTX parameters.

19. The method according to claim 16, wherein the indication information indicates the UE, after the time point wait for a predefined time before sending the DPCCH on the second carrier of the DC-HSUPA according to the indication information and the uplink DTX parameters.

* * * * *